(12) United States Patent
Landers et al.

(10) Patent No.: US 8,061,400 B2
(45) Date of Patent: Nov. 22, 2011

(54) FASTENER ASSEMBLY SECURED TO A TIRE SIDEWALL

(75) Inventors: Samuel Patrick Landers, North Canton, OH (US); John Steven Attinello, Battleboro, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 509 days.

(21) Appl. No.: 12/348,342

(22) Filed: Jan. 5, 2009

(65) Prior Publication Data
US 2010/0170609 A1    Jul. 8, 2010

(51) Int. Cl.
*B60C 13/00*    (2006.01)

(52) U.S. Cl. ............... 152/524; 152/152.1; 152/523

(58) Field of Classification Search ............... 152/152.1, 152/523, 524
See application file for complete search history.

(56) References Cited

U.S. PATENT DOCUMENTS

| | | |
|---|---|---|
| D57,136 S | 2/1921 | Lambert |
| D57,363 S | 3/1921 | Lambert |
| 1,430,100 A | 9/1922 | Mitchell |
| 3,164,192 A | 1/1965 | Kasio et al. |
| 3,449,201 A | 6/1969 | Palmquist et al. ............ 161/164 |
| 4,317,479 A | 3/1982 | McDonald .................... 152/353 |
| 4,318,436 A | 3/1982 | Shurman ....................... 152/353 |
| 4,442,618 A | 4/1984 | Minter et al. ................... 40/587 |
| 4,684,431 A | 8/1987 | Shurman et al. .............. 156/394 |
| D293,563 S | 1/1988 | Fuzioka et al. ............... D12/139 |
| D354,262 S | 1/1995 | Harms ......................... D12/136 |
| 5,904,794 A | 5/1999 | Boissonnet et al. .......... 156/230 |
| D410,603 S | 6/1999 | Chandler et al. ............. D12/152 |
| 6,053,228 A | 4/2000 | Baker ............................ 152/523 |
| 6,080,465 A | 6/2000 | Boissonnet et al. .......... 428/139 |
| 6,513,560 B2 | 2/2003 | Roesgen et al. .............. 152/523 |
| 6,641,041 B2 | 11/2003 | Olds et al. ..................... 235/454 |
| 7,108,761 B2 | 9/2006 | Bell ............................ 156/110.1 |
| D536,298 S | 2/2007 | Becker et al. ................ D12/605 |
| D548,681 S | 8/2007 | Becker et al. ................ D12/605 |
| 2007/0215260 A1 | 9/2007 | Kleckner ...................... 152/450 |

FOREIGN PATENT DOCUMENTS

| | | |
|---|---|---|
| JP | 2004322885 | 11/2004 |
| WO | WO 2007121768 A1 * | 11/2007 |

OTHER PUBLICATIONS

English machine translation of JP 2004-322885, retrieved from JPO database Jul. 20, 2011.*

* cited by examiner

*Primary Examiner* — Joseph Del Sole
*Assistant Examiner* — Timothy Kennedy
(74) *Attorney, Agent, or Firm* — Robert N. Lipcsik

(57) ABSTRACT

A fastener assembly for a pneumatic tire includes a protruding portion, a fastener, and a securable attachment. The protruding portion is integrally formed with a sidewall of the tire and extends away from the sidewall of the tire. The protruding portion has an annular outer surface and a knob. The fastener has an annular inner surface and an annular outer surface. The annular inner surface engages the annular outer surface of the protruding portion. The annular outer surface has a recess. The securable attachment has an annular inner surface for engaging the recess of the outer surface of the fastener such that the securable attachment is secured to the fastener and both the securable attachment and the fastener are secured to protruding portion of the sidewall of the tire.

5 Claims, 6 Drawing Sheets

FASTENER ASSEMBLY SECURED TO A TIRE SIDEWALL

FIELD OF INVENTION

The present invention relates to securing a fastener assembly to a tire and, more particularly, to using the fastener assembly to secure a medallion or shield to a sidewall of a tire.

BACKGROUND OF THE INVENTION

Conventional pneumatic tires have sidewalls or portions thereof of different color than the remainder of the tire. Typically, tires have a black tread and sidewall but the provision of raised, generally white, letters or colored areas in the tire sidewall has been in great demand by the public and is being provided by virtually all tire manufacturers. These decorative sidewalls are usually built integrally with the pneumatic tires by well known procedures. However, such decorative tires are not only costly to build and involve relatively expensive manufacturing procedures, but also may make use of pigments that are not always fully compatible with the remaining portions of the tire sidewall.

While efforts have conventionally been made to provide removable types of sidewall trim members that may be affixed in, or to, a pneumatic tire sidewall, it has been difficult to provide pneumatic tire trim members that may be positively secured in place on, or in combination with, a pneumatic tire sidewall so as to remain in good operative engagement therewith over a long service life.

Conventional efforts to resolve these problems have included the use of removable sidewall or trim members wherein a radially inner edge or flange section is physically interlocked between the tire bead and the wheel flange when the tire is deflated and being positioned on the wheel. Such efforts have complicated mounting and dismounting of the tire to the wheel. Other conventional efforts have included securing the tire sidewall to the tire and wheel assembly by means of a wheel cover or hub cap that attaches and engages a radial inner portion of a sidewall to secure the wheel cover in place.

Another conventional effort utilizes an annular flexible tire trim member that engages a sidewall of a tire via coupling means having continuous annular grooves and lips on sidewall members and the tire sidewall. These circumferentially continuous coupling means may also utilize male or female coupling on the tire sidewall to match a complementary female or male coupling on an inner face of the sidewall. However, this continuous type of coupling or retention, once disengagement is initiated at any one point, rapidly continues until the entire member disengages. In addition, individualized or personalized styling treatments, as may be desired by the end user, are generally not feasible.

Still another conventional removable sidewall trim member utilizes a detachable tire sidewall addition member in combination with a circumferentially discontinuous first coupling means adapted to operatively interact with a complementary second coupling means on the tire sidewall addition member for securing the sidewall addition member to the tire sidewall. Typically, a plurality of geometrically-shaped, detachable sidewall addition members may be utilized with each sidewall addition member having its own coupling means adapted to operatively interact with one of a plurality of independent and circumferentially discontinuous coupling means on the tire sidewall. Each coupling means may be independent, localized, and separate from the other coupling means, i.e., no one annular coupling means in the tire sidewall that is circumferentially continuous relative to the annular extent of the sidewall and no continuous coupling means on the addition member that may engage more than one coupling means on the tire sidewall.

The location on the tire sidewall of the various conventional addition members may be both a matter of choice and/or function of intended use. The addition members may take the form of a great variety of geometric shapes, colors, and textures. The addition members may be removably coupled with the tire sidewall with a mechanical coupling means, such as a recess or depression adjacent to a peripheral undercut for yieldingly receiving and retaining a peripheral portion of the addition member. The addition members may be provided with an indicium and a portion of the indicium may be of a color differing from the remainder of the addition member. The sizes, shapes, and thicknesses, as well as the material compositions and elasticities of the addition members, may also vary greatly depending on the intended use thereof.

The conventional addition members may provide distinctive styling, but also permit unique personalized identification. Tire branding information may be accomplished by the use of appropriate addition members. The conventional addition members may also be weighted to provide static and dynamic balancing features to the tire. It may also be possible to couple the addition members to the tire sidewall such that they disengage at a particular load and/or tire inflation pressure. Specialized coatings may further provide visual notification of possible tire damage or departure from normal operating conditions. If abnormal operating conditions do occur or there is damage to the addition members via scuffing, for example, the addition members may readily be replaced since they are detachably secured to the sidewall.

SUMMARY OF THE INVENTION

A fastener assembly for a pneumatic tire, in accordance with the present invention, includes a protruding portion, a fastener, and a securable attachment. The protruding portion is integrally formed with a sidewall of the tire and extends away from the sidewall of the tire. The protruding portion has an annular outer surface and a knob. The fastener has an annular inner surface and an annular outer surface. The annular inner surface engages the annular outer surface of the protruding portion. The annular outer surface has a recess. The securable attachment has an annular inner surface for engaging the recess of the outer surface of the fastener such that the securable attachment is secured to the fastener and both the securable attachment and the fastener are secured to protruding portion of the sidewall of the tire.

In accordance with another aspect of the present invention, the annular outer surface of the protruding portion has a constant diameter as the protruding portion extends away from the sidewall of the tire to the knob of the protruding portion.

In accordance with still another aspect of the present invention, the annular inner surface of the fastener has a constant diameter as the fastener extends away from the sidewall of the tire.

In accordance with yet another aspect of the present invention, the annular outer surface of the fastener comprises a cylindrical outer surface and a recess for receiving a portion of the securable attachment.

In accordance with still another aspect of the present invention, a plurality of securable attachments are secured to the sidewall of the tire and a shield is secured to the securable attachments.

In accordance with yet another aspect of the present invention, the annular outer surface of the fastener engages the inner surface of the securable attachment such that the securable attachment is secured against movement away from the sidewall of the tire.

A pneumatic tire in accordance with the present invention includes a tread portion and two sidewalls extending radially inward from the tread portion. At least one sidewall has at least one protruding portion extending axially away from the sidewall, at least one fastener attached to each protruding portion, and at least one securable attachment attached to each fastener. The protruding portion is integrally formed with the sidewall of the tire. The protruding portion has an annular outer surface and a knob. The fastener has an annular inner surface and an annular outer surface. The annular inner surface engages the annular outer surface of the protruding portion. The securable attachment has an inner surface for engaging the annular outer surface of the fastener such that the securable attachment is at least axially secured to the fastener and both the securable attachment and the fastener are at least axially secured to the protruding portion of the sidewall of the tire.

In accordance with another aspect of the present invention, each sidewall has at least one protruding portion.

In accordance with still another aspect of the present invention, the annular outer surface of the protruding portion has a constant diameter as the protruding portion extends away from the sidewall of the tire to the knob and the annular inner surface of the fastener has a constant diameter as the fastener extends away from the sidewall of the tire.

In accordance with yet another aspect of the present invention, the annular outer surface of the fastener comprises a recess for receiving a portion of the annular inner surface of the securable attachment.

In accordance with still another aspect of the present invention, a second securable attachment is secured to the first securable attachment for attaching a shield to the sidewall of the tire.

DESCRIPTION OF EXAMPLE EMBODIMENTS OF THE INVENTION

Figure 1:
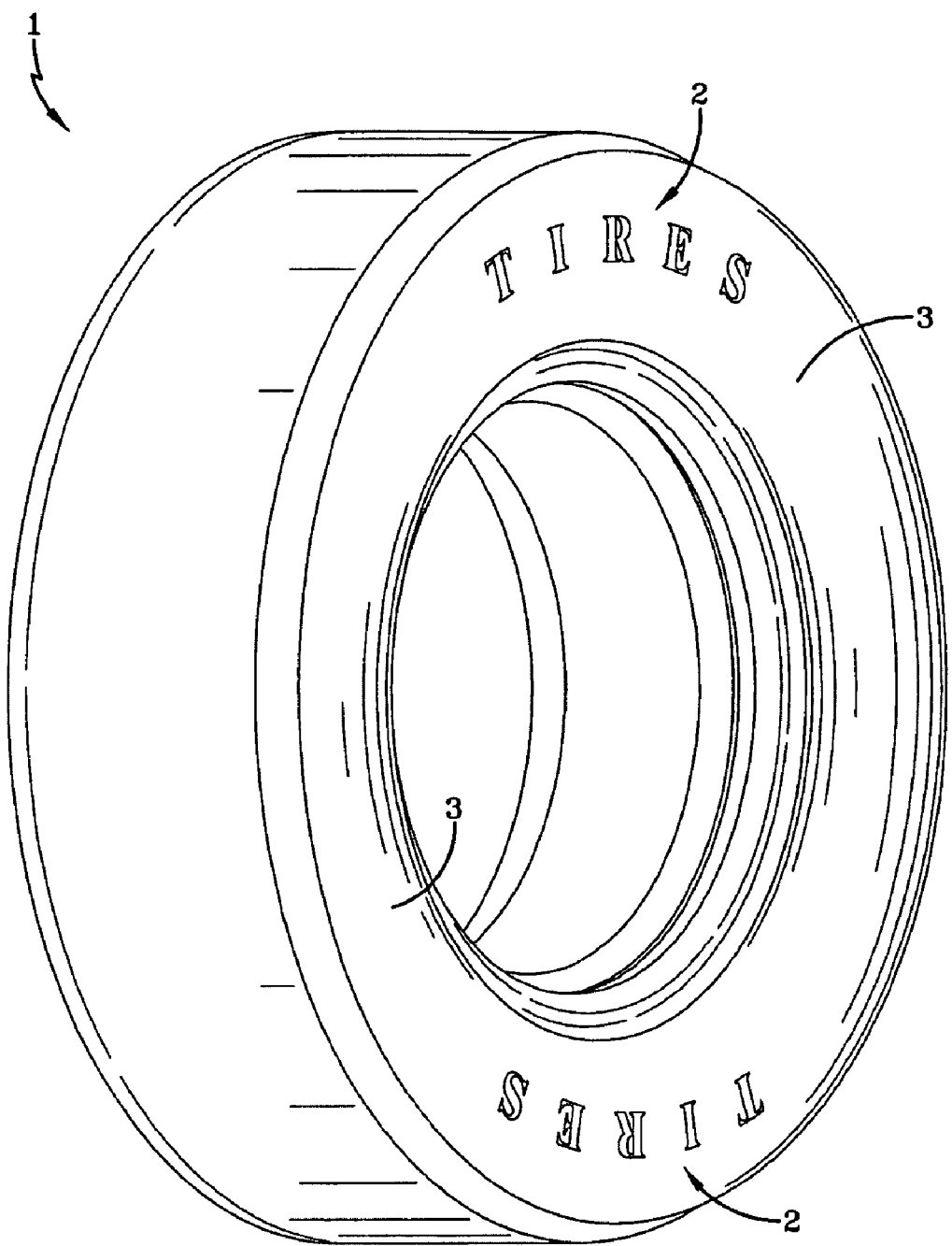
FIG. 1 is a schematic isometric view of a conventional tire with sidewall lettering.

FIG. 1 illustrates a conventional tire 1 having various indicia 2 carved out and/or molded directly into the sidewall 3 of the tire. As stated above, this type of marking eliminates the ability of changing the indicia 3 without changing the tire 1 itself.

Figure 2:
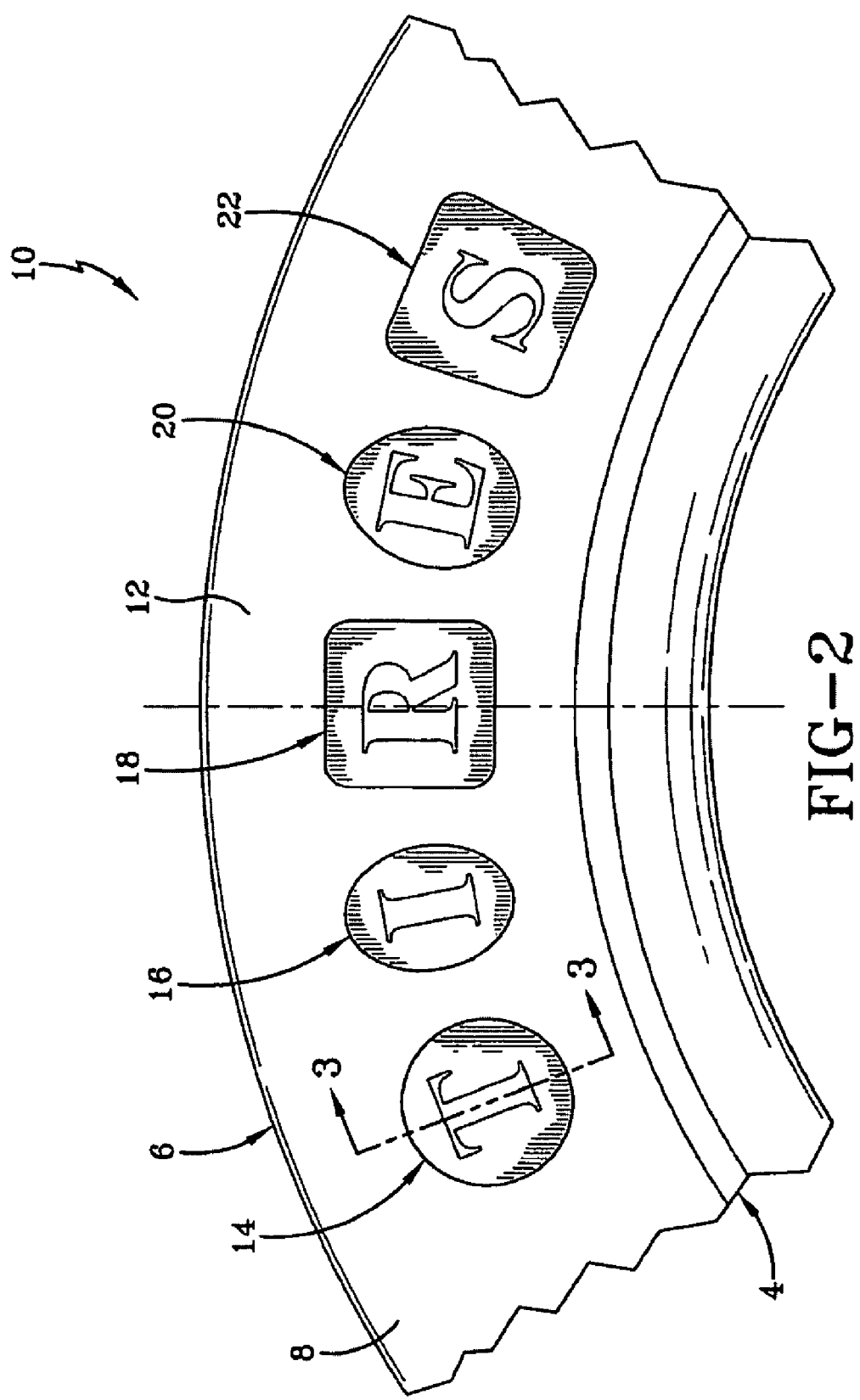
FIG. 2 is a schematic fragmentary view of a sidewall of a pneumatic tire in accordance with the present invention.

FIG. 2 illustrates a fragmentary view of a sidewall 12 of a pneumatic tire 10. The tire 10 has several variations of a securable attachment such as a retainer and/or medallion assembly 14, 16, 18, 20 and 22 in an installed condition in accordance with the present invention. "Sidewall", for the purpose of this example tire 10, is the area of the tire extending from a shoulder 8 of the tire tread 6 to a bead 4 of the tire or rim flange area of the wheel upon which the example tire is mounted. Further, it is contemplated that securable attachments in accordance with the present invention may also be utilized on one or both sidewalls 12 of a tire, such as the example tire 10.

Figure 3:
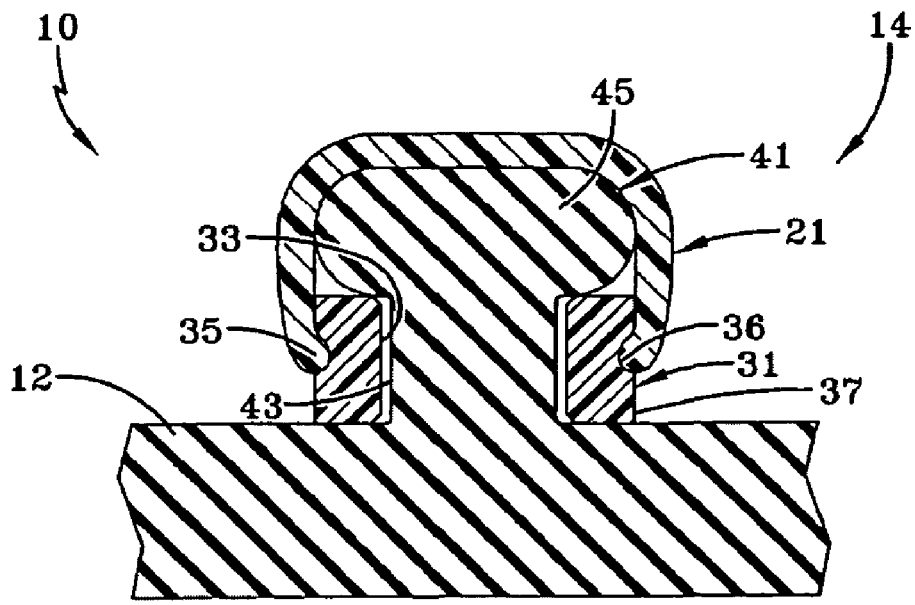
FIG. 3 is an example schematic section view of a portion of the sidewall of FIG. 2 taken along line 3-3.

A section taken along line 3-3 in FIG. 2 is shown in FIG. 3 illustrating one example of a fastener assembly 14 in accordance with the present invention. The fastener assembly 14 includes a circular securable attachment 21 received and retained by an intermediate fastener 31 and a protruding portion 41 integral to the tire sidewall 12 and extending axially away from the tire sidewall. The protruding portion 41 has an annular outer surface 43 and a toroidal knob 45. The fastener 31 includes a generally cylindrical opening 33 corresponding to the generally cylindrical outer surface 43 of the protruding portion 41 of the tire sidewall 12. The intermediate fastener 31 includes portions 35 extending radially inward to engage recesses 36 in an outer surface 37' of the securable attachment 21. The example protruding portion 41 of FIG. 3 may have a diameter A of 0.30 inches, a protrusion diameter B of 0.40 inches, and an extension dimension C of 0.15 inches.

Figure 4:
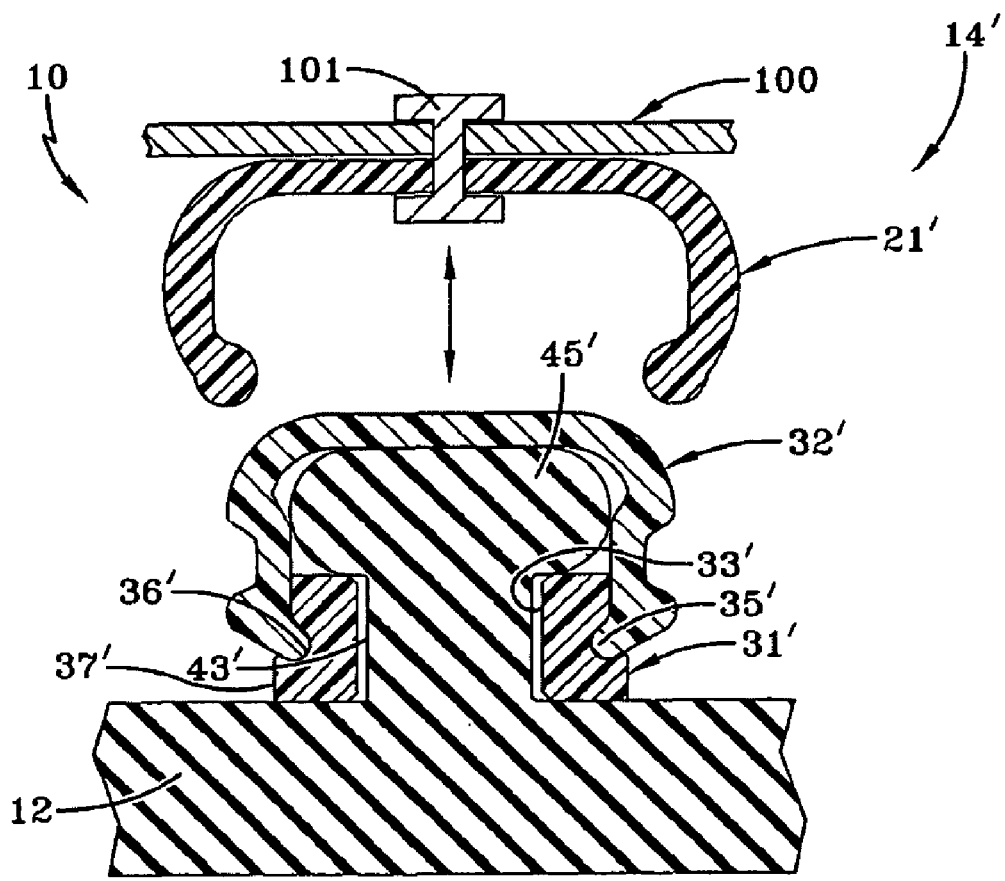
FIG. 4 is another example schematic section view of a portion of the sidewall of FIG. 2 taken along line 3-3.

Another section taken along line 3-3 in FIG. 2 is shown in FIG. 4 illustrating another example of a similar fastener assembly 14' in accordance with the present invention. The fastener assembly 14' may also include a securable attachment 21' received and retained by a first intermediate fastener 31', a second intermediate fastener 32', and a protruding portion 41' integral to the tire sidewall 12. The first intermediate fastener 31' includes a generally cylindrical opening 33' corresponding to a generally cylindrical outer surface 43' of the protruding portion 41' of the tire sidewall 12. The second intermediate fastener 32' includes portions 35' extending radially inward to engage recesses 36' in an outer surface 37' of the first intermediate fastener 31'.

Figure 5:
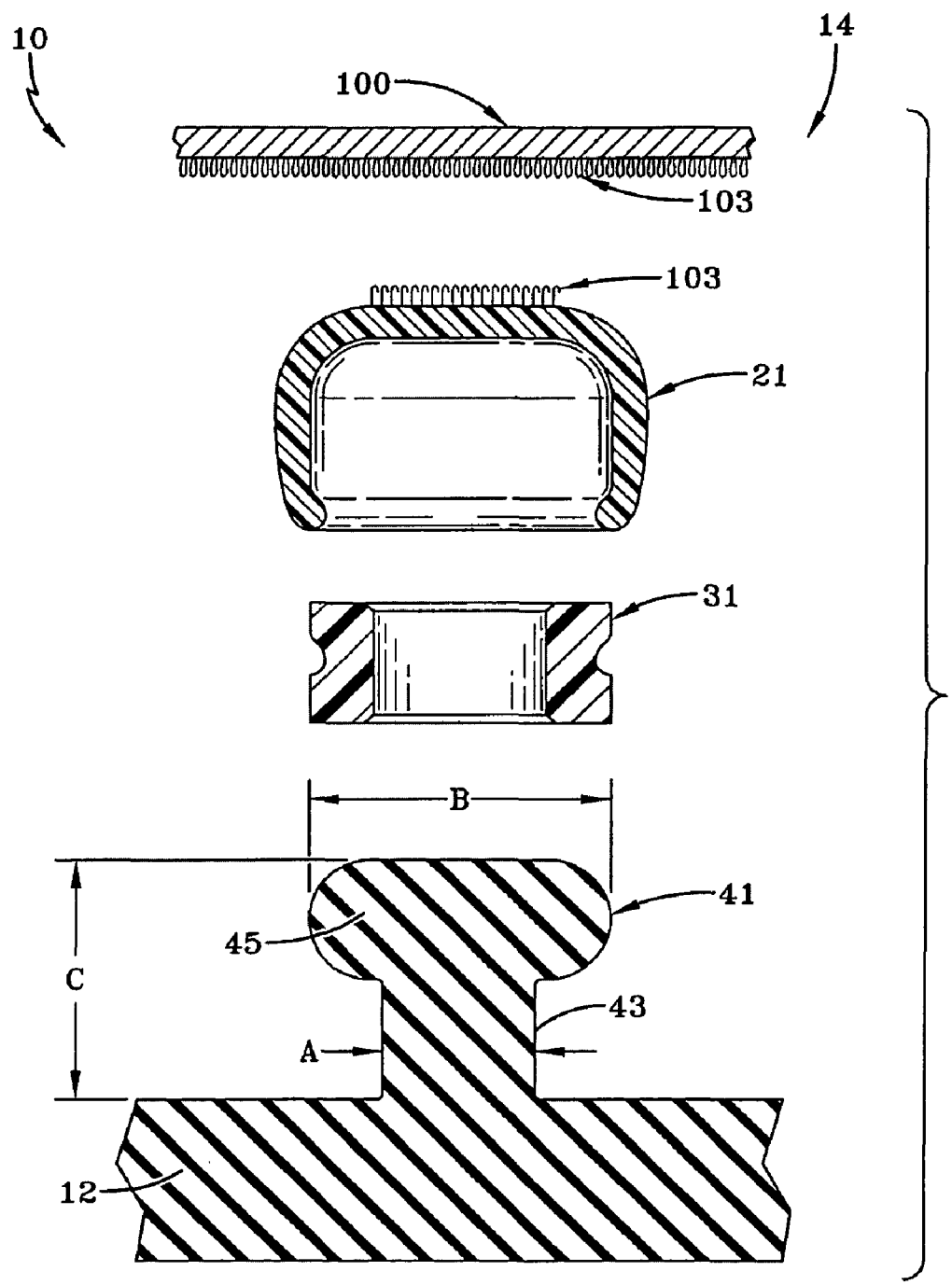
FIG. 5 is an exploded section view of the portion of the sidewall of FIG. 2.
Figure 9:
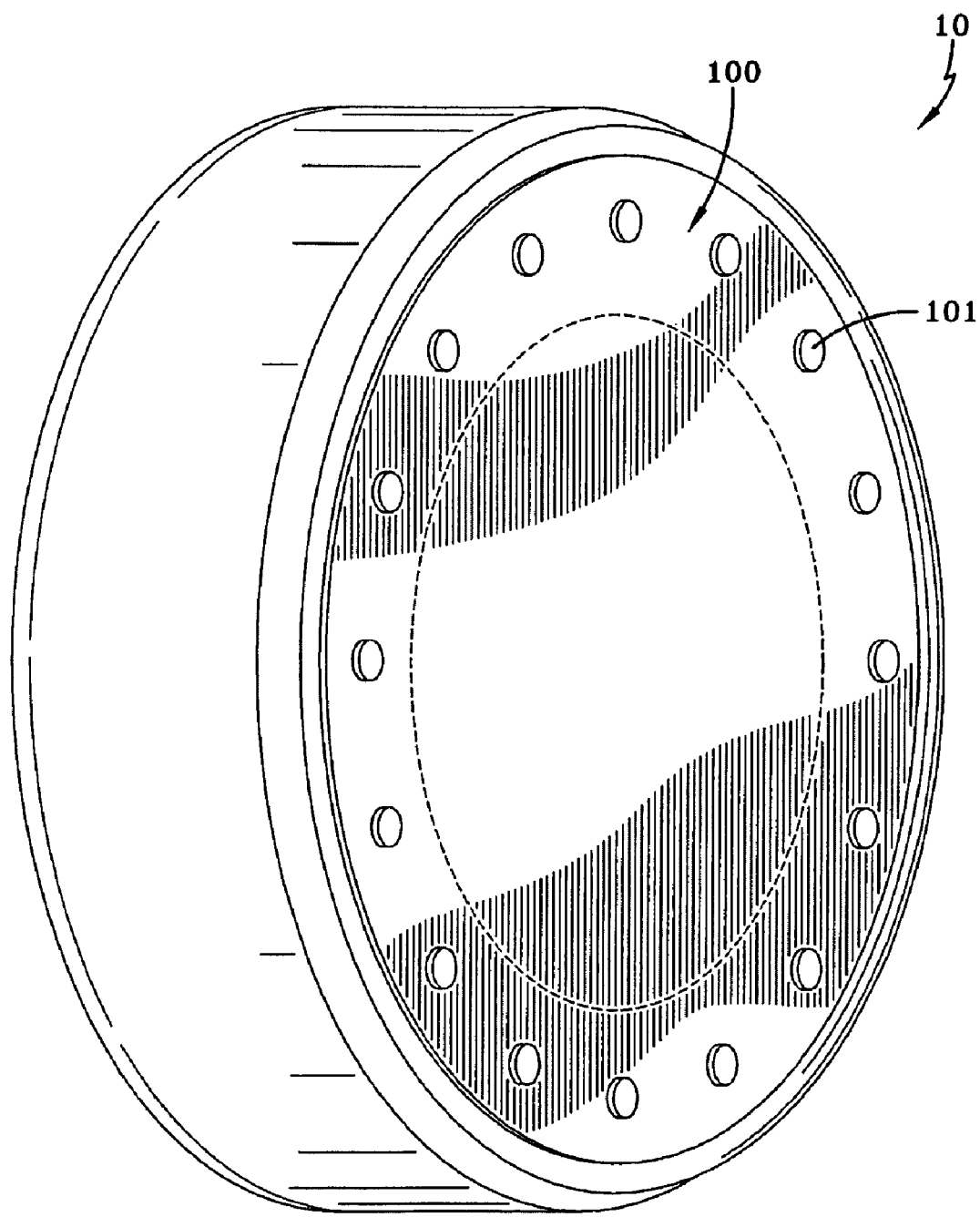
FIG. 9 is a schematic isometric view of a tire with a shield attachment.

As seen in FIG. 2, securable attachments in accordance with the present invention may be circular 14, 14', oval 16, square 18, egg shaped 20, trapezoidal 22, or any other suitable shape without changing the circular shape and structure of the fastener 31, 31', 32' or protruding portion 41, 41'. Further, as seen in FIGS. 4, 5, and 9, the securable attachment may be a shield 100 attached to a securable attachment 21 or 21' by a suitable means such as a spool-shaped pin 101 or hook and loop fasteners 103. The shield 100 may be constructed of any suitable material, such as asbestos for protecting the tire under battle conditions. However, in the alternative, the opening of the fastener 31, 31' and outer surface of the protruding portion 41, 41' may also be non-circular (not shown) as long as the inner surface of the opening of the fastener mates correspondingly with the outer surface of the protruding portion so that the fastener assembly 10 secures to the protruding portion 41 of the sidewall 12 of the tire 10, as described below. Such a non-circular configuration will also maintain the orientation of the securable attachment relative to the sidewall 12 during operational rotation of the tire 10. Further, a single securable attachment may be configured to attach to two or more protruding portions, thereby also fixing the securable attachment against relative movement versus the sidewall.

Figure 6:
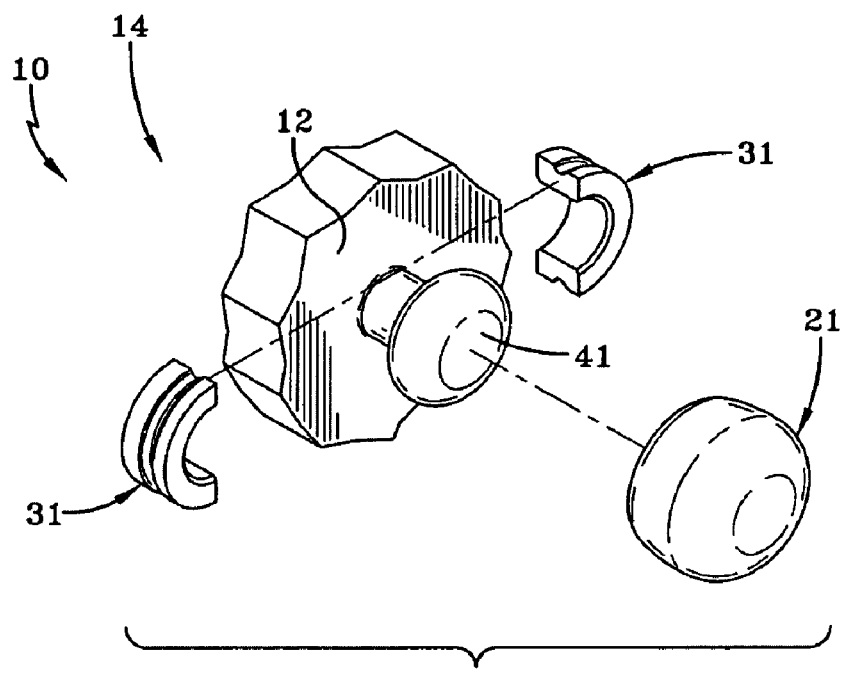
FIG. 6 is a schematic exploded isometric view of the portion of the sidewall of FIG. 2.
Figure 7:
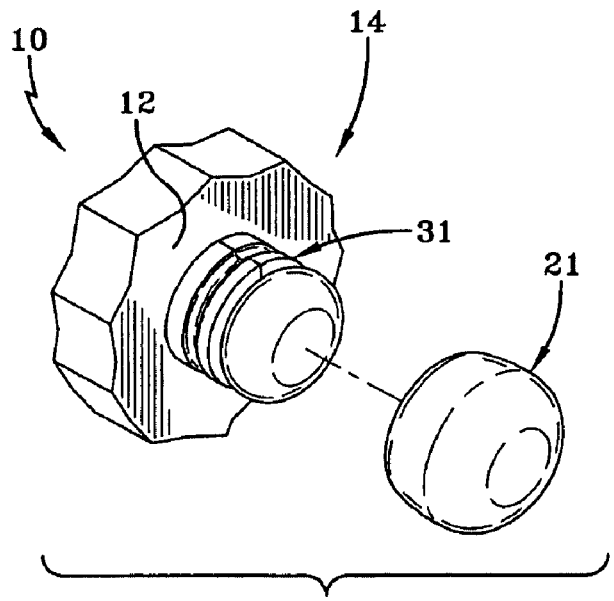
FIG. 7 is a schematic partially assembled isometric view of the portion of the sidewall of FIG. 2.

As seen in FIG. 6, the fastener 31' further comprises two semi-cylindrical pieces 38'. When the fastener 31' is constructed of a stiff material, such as steel, the two pieces 38' of the fastener may be placed around the protruding portion 41' so that the protruding portion extends through the opening 33' and the fastener is temporarily secured to the tire 10, as seen in FIG. 7. The fastener 31' may also have a hinge (not shown) for facilitating the placement of the fastener over the protruding portion 41'.

Figure 8:
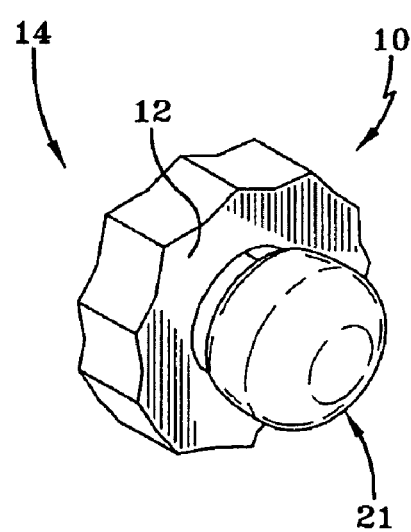
FIG. 8 is a schematic completely assembled isometric view of the portion of the sidewall of FIG. 2.

When the intermediate fastener 31 is placed over the protruding portion 41 and the securable attachment 21 is placed over the outer periphery of the intermediate fastener, the securable attachment and fastener become fixedly secured to the protruding portion and the sidewall 12 of the tire 10 (FIG. 8). The resilient nature of the securable attachment 21 may allow for a snap-on fit between the outer surface 37 of the intermediate fastener 31 and the inner portions 35 of the securable attachment 21. The engagement of the outer surface 35 and the portions 35 may secure the attachment 21 and intermediate fastener 31 to the sidewall 12 of the tire 10 by preventing the intermediate fastener 31 from moving radially outward and out of engagement with the protruding portion 41 of the sidewall 12.

Further, the portion 35 of the securable attachment may be an annular lip extending radially inward from the inner surface of the securable attachment for engaging a corresponding annular groove (the recess 36) in the outer surface 37 of the intermediate fastener 31. The engagement of the lip and groove secures the securable attachment 21 and intermediate fastener 31 to the sidewall 12 of the tire 10 by preventing the intermediate fastener 31 from moving radially outward and out of engagement with the protruding portion 41 of the sidewall 12.

A fastener assembly in accordance with the present invention, such as example assemblies 14, 14', 16, 18, 20, and 22, provides a simple, low cost, reliable means for attaching a decorative or functional object to the sidewall of a tire. The fastener assembly may further maintain rubber volume and provide secure mechanical attachment against high speed operation, curb scuffs, etc. The fastener assembly additionally provides flexibility for adding any image, color, lighting, etc. to the sidewall of a tire. If the fastener assembly is damaged, it is also easily replaced without even removing the tire from the vehicle.

As stated above, it should be clear at this time that the securable attachments of this invention may include a variety of geometric shapes including, but not limited to, circles, elipses, squares, triangles, and diamonds, as well as any desired combinations thereof. If a securable attachment is circular, an anti-rotation device may be required if, for example, the securable attachment is provided with a decorative or indicia bearing display surface that is direction sensitive. Other shapes may be inherently non-rotatable if snugly fitted into a corresponding coupling means of the type previously described.

Further, fastener assemblies in accordance with the present invention may be placed anywhere along the radial extent of a tire sidewall and may be used in pluralities around the annular extent of the sidewall, regardless of the type of fasteners, and may be at elevations less than, the same as, or greater than the surrounding surface. The securable attachments may be of the same or of a color differing from the sidewall and/or the remainder of the tire and may also be designed to provide distinctive, unique, and customized styling. For example, the securable attachments may be coded or printed to provide manufacturer or brand name, user or personalized identification, etc. If desired, indicia, such as in the form of letters or numbers, of various colors and color combinations, may be uniquely assembled to fit the desires of a particular end user. The retainers/medallions may be reflective, iridescent, or phosphorescent coated in order to provide reflective safety features. Both the inner and outer exposed sidewall surfaces of a tire may be provided with securable attachments and the securable attachments may be selectively weighted to provide static and dynamic balancing features to the tire. This is typically accomplished on the inner exposed sidewall surface.

From the foregoing description, it is believed that those familiar with the art will readily recognize and appreciate the novel concepts and features of the present invention. Obviously, while the invention has been described in relation to but a limited number of examples, numerous further variations, changes, substitutions, and equivalents will present themselves to persons skilled in the art and may be made without necessarily departing from the scope and principles of the invention, with the latter being determined solely by reference to the claims appended hereto.

We claim:

1. A pneumatic tire comprising:
   a tread portion; and
   two sidewalls extending radially inward from the tread portion,
   at least one sidewall having at least one protruding portion extending axially away from the sidewall, at least one fastener attached to each protruding portion, and at least one securable attachment attached to each fastener,
   the protruding portion being integrally formed with the sidewall of the tire, the protruding portion having an annular outer surface and a knob,
   the fastener having an annular inner surface and an annular outer surface, the annular inner surface engaging the annular outer surface of the protruding portion, the fastener further comprising two semi-cylindrical pieces for facilitating placement of the fastener around the annular outer surface of the protruding portion,
   the securable attachment having an inner surface for engaging the annular outer surface of the fastener such that the securable attachment is at least axially secured to the fastener and both the securable attachment and the fastener are at least axially secured to the protruding portion of the sidewall of the tire.

2. The pneumatic tire as set forth in claim 1 wherein each sidewall has at least one protruding portion.

3. The pneumatic tire as set forth in claim 1 wherein the annular outer surface of the protruding portion has a constant diameter as the protruding portion extends away from the sidewall of the tire to the knob and the annular inner surface of the fastener has a constant diameter as the fastener extends away from the sidewall of the tire.

4. The pneumatic tire as set forth in claim 1 wherein an annular outer surface of the fastener comprises a recess for receiving a portion of the annular inner surface of the securable attachment.

5. The pneumatic tire as set forth in claim 1 wherein a second securable attachment is secured to the first securable attachment for attaching a shield to the sidewall of the tire.

* * * * *